United States Patent
Kumar et al.

(10) Patent No.: US 10,817,320 B2
(45) Date of Patent: Oct. 27, 2020

(54) HIGH RESOLUTION TIMER EXPIRY IN LIVE PARTITION MIGRATION

(71) Applicant: International Business Machines Corporation, Armonk, NY (US)

(72) Inventors: Keerthi B. Kumar, Bangalore (IN); Brahadambal Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 14/966,589

(22) Filed: Dec. 11, 2015

(65) Prior Publication Data

US 2017/0168737 A1 Jun. 15, 2017

(51) Int. Cl.
*G06F 3/06* (2006.01)
*G06F 9/455* (2018.01)
(Continued)

(52) U.S. Cl.
CPC ........ *G06F 9/45558* (2013.01); *G06F 9/5077* (2013.01); *G06F 12/109* (2013.01); *G06F 12/1027* (2013.01); *G06F 3/0604* (2013.01); *G06F 3/0617* (2013.01); *G06F 3/0647* (2013.01); *G06F 3/0688* (2013.01); *G06F 2009/4557* (2013.01); *G06F 2009/45583* (2013.01); *G06F 2009/45591* (2013.01); *G06F 2212/1016* (2013.01); *G06F 2212/1032* (2013.01); *G06F 2212/152* (2013.01); *G06F 2212/68* (2013.01)

(58) Field of Classification Search
CPC .... G06F 3/0619; G06F 3/0647; G06F 3/0683; G06F 9/45558; G06F 12/1027
See application file for complete search history.

(56) References Cited

U.S. PATENT DOCUMENTS 5,757,801 A * 5/1998 Arimilli ................ H04J 3/1688
370/444
7,849,347 B2 12/2010 Armstrong et al.
(Continued)

OTHER PUBLICATIONS

Bailey, et al., "IBM PowerVM Live Partition Mobility", IBM Redbooks, Second Edition (Mar. 2009). 312 pages. © Copyright International Business Machines Corporation 2007, 2009.

*Primary Examiner* — Reginald G Bragdon
*Assistant Examiner* — Eric T Loonan
(74) *Attorney, Agent, or Firm* — Jay Wahlquist

(57) ABSTRACT

A method for improving accuracy of high resolution timers in a live partition migration comprises determining a status of each page of a plurality of pages to be copied from a source partition to a target partition during the live partition migration. One or more pages of the plurality of pages correspond to a respective high resolution timer. The method comprises determining that each of the one or more pages corresponding to a respective high resolution timer has a clean status. A clean status indicates that the corresponding page has been copied to the target partition and has not been modified subsequent to being copied to the target partition. The method also comprises halting operation of the source partition and initiating operation of the target partition in response to determining that each of the one or more pages corresponding to a respective high resolution timer has a clean status.

20 Claims, 4 Drawing Sheets

(51) Int. Cl.
    *G06F 12/1027*    (2016.01)
    *G06F 12/109*     (2016.01)
    *G06F 9/50*      (2006.01)

(56) References Cited

U.S. PATENT DOCUMENTS

| | | | |
|---|---|---|---|
| 7,882,326 | B2 | 2/2011 | Armstrong et al. |
| 7,984,262 | B2 | 7/2011 | Battista et al. |
| 8,019,962 | B2 | 9/2011 | Armstrong et al. |
| 9,363,336 | B2 * | 6/2016 | Lawson .............. G05B 19/4185 |
| 9,594,598 | B1 * | 3/2017 | Brouwer ................ G06F 9/5077 |
| 2008/0133885 | A1 * | 6/2008 | Glew .................... G06F 9/3012 |
| | | | 712/42 |
| 2008/0235482 | A1 * | 9/2008 | Armstrong ............ G06F 9/4856 |
| | | | 711/173 |
| 2008/0256321 | A1 * | 10/2008 | Armstrong ............ G06F 9/4856 |
| | | | 711/173 |
| 2010/0205252 | A1 * | 8/2010 | Dorai .................... G06F 9/4856 |
| | | | 709/205 |
| 2010/0251235 | A1 * | 9/2010 | Ganguly ............. G06F 9/45558 |
| | | | 718/1 |
| 2011/0066597 | A1 * | 3/2011 | Mashtizadeh ......... G06F 3/0617 |
| | | | 707/640 |
| 2013/0160012 | A1 | 6/2013 | Ganguly et al. |
| 2015/0163270 | A1 * | 6/2015 | Lyons .................... H04L 65/60 |
| | | | 463/42 |

* cited by examiner

HIGH RESOLUTION TIMER EXPIRY IN LIVE PARTITION MIGRATION

BACKGROUND

Data migration refers generally to the processes of moving computer data from one computer location to another. For instance, an administrator may facilitate maintenance or updates by transferring applications and/or memory from one operating system or computer to another. Logical partitioning provides a programmed architecture suited for assigning and sharing computing assets. A partition may logically comprise a portion of a machine's physical processors, memory and other resources. As such, an administrator may allocate the same resources to more than one partition. Each partition may additionally host an operating system, in addition to multiple virtual processors. Underlying firmware, called a hypervisor, assigns and dispatches physical processors to each virtual processor. Each partition typically has unique connections for communicating with a network. In this manner, each partition operates largely as if it is a separate computer.

During a migration, the state of the migrating logical partition, including applicable memory, processor/register state information, and connection information regarding physical interface/discs associated with the virtual partition components, etc., is transferred to another logical partition of another computer. In a sense, a migration may comprise moving a single 'live' partition from a target system hypervisor to a source system hypervisor. The migration may be motivated to accommodate new hardware or program updates on the computer of the migrating logical partition. Oftentimes the migrated logical partition is eventually returned to the original logical partition location.

The migrating partition ideally continues work without interruption on the new logical partition. The hypervisor may be responsible for providing the infrastructure that allows for the migration to occur from the source logical partition system hypervisor to a target system hypervisor logical partition. The target logical partition may be newly created for the migration and is configured to accommodate the state of the transferred logical partition.

SUMMARY

Aspects of the disclosure provide a method, system, and computer program product for improving accuracy of high resolution timers in a live partition migration. In one embodiment, the method comprises determining a status of each page of a plurality of pages to be copied from a source partition to a target partition during the live partition migration. One or more pages of the plurality of pages correspond to a respective high resolution timer. The method also comprises determining that each of the one or more pages corresponding to a respective high resolution timer has a clean status. A clean status indicates that the corresponding page has been copied to the target partition and has not been modified subsequent to being copied to the target partition. The method also comprises halting operation of the source partition and initiating operation of the target partition in response to determining that each of the one or more pages corresponding to a respective high resolution timer has a clean status.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
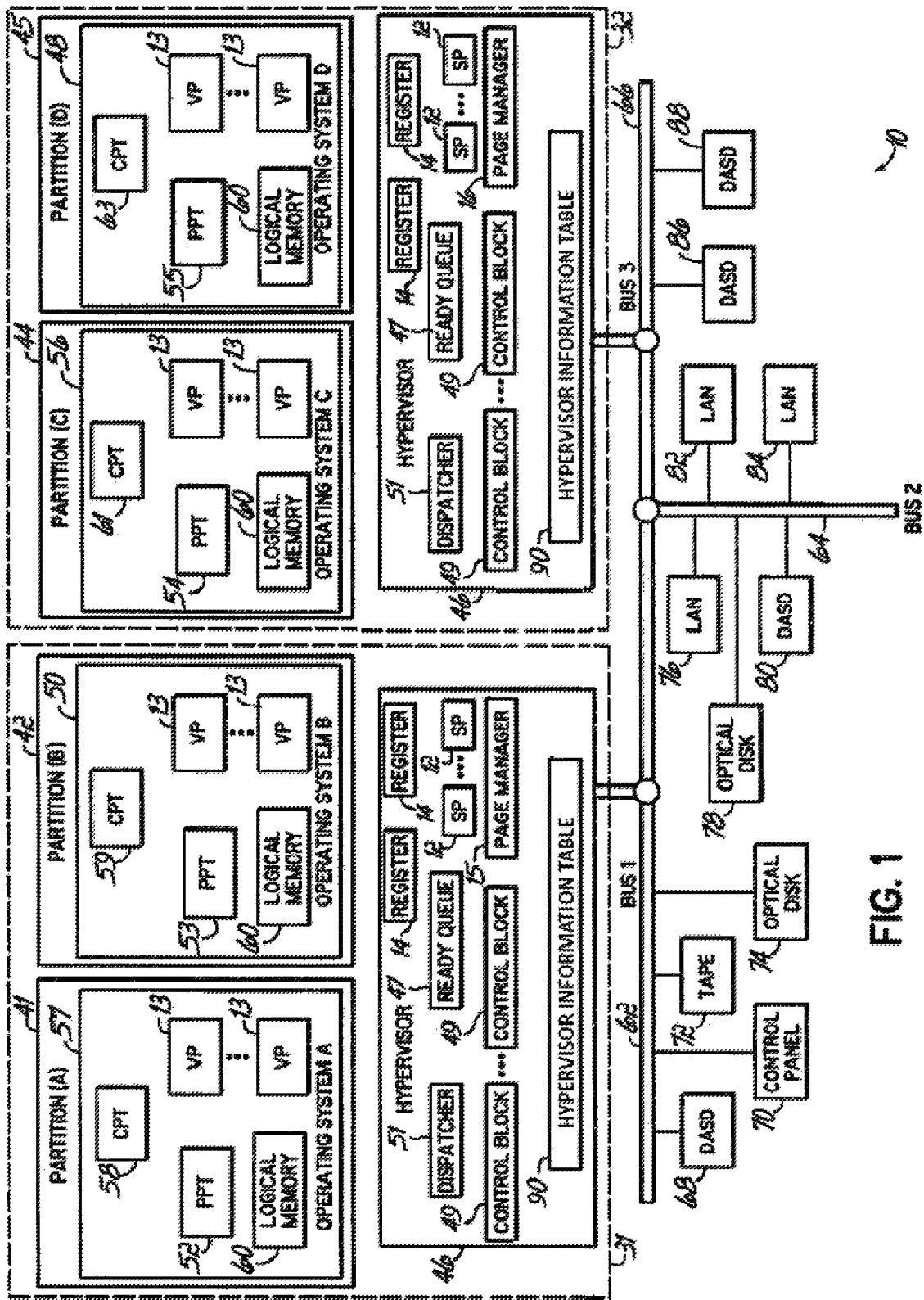
FIG. 1 is a block diagram of one embodiment of an example system configured to improve the accuracy of high resolution timer expiry in a live partition migration

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 illustrates one embodiment of an example system 10 configured to improve the accuracy of high resolution timer expiry in a live partition migration (LPM). As used herein, a live partion migration refers to a data migration in which a running partition is moved from a source system to a destination system without stopping the operating system, the applications, or the services provided by the running partition to perform the migration process. The system 10 includes a plurality of partitions 41, 42 and 44, 45 that may share common processing resources among multiple processes within their respective server computers 31, 32. Each computer 31, 32 may rely upon a single computing machine having one or more physical processors 12, or central processing units (CPU's). The physical processors 12 may execute software configured to simulate multiple virtual processors 13.

The partitions 41, 42, 44, 45 may logically comprise a portion of a system's physical processors 12, memory and other resources as assigned by an administrator. Each partition 41, 42, 44, 45 typically hosts an operating system 48, 50, 56, 57 and may have multiple virtual processors 13. In this manner, each partition 41, 42, 44, 45 may operate largely as if it is a separate computer.

As shown in FIG. 1, physical page tables 52, 53, 54, 55 and cache page tables 58, 59, 61, 63 are shown in FIG. 1 as being associated with respective partitions 50, 56, 57, 58. However, this association is not intended to imply that the page tables, i.e., the physical page tables 52, 53, 54, 55 and cache page tables 58, 59, 61, 63, are partition resources. For instance, the page tables may actually be resources of the hypervisors 46. As such, the placement of the tables as shown in FIG. 1 is intended to more clearly show the association of each table with the respective partition. While not operating in virtualized partition memory mode, the cache page tables 58, 59, 61, 63 may operate respectively as the only page tables for accepting entries from the partitions 41, 42, 44, 45 and processors 12. The physical page table 52, 53, 54, 55 may be relatively smaller than the cache page table 58, 59, 61, 63, and may receive page entries from processors 12 while the logical partitions 41, 42, 44, 45 are in virtualized partition memory mode. Processors may use the page tables to transparently convert a program's virtual address into a physical address where that page has been mapped into physical memory.

Underlying programs, called hypervisors 46, or partition managers, may generally use the physical page tables 52, 53, 54, 55 to update the cache page tables 58, 59, 61, 63. The hypervisors 46 typically are responsible for assigning physical resources to each partition 41, 42, 44, 45. For instance, a hypervisor 46 may intercept requests for resources from operating systems 48, 50, 56, 57 to globally share and allocate resources. If the partitions 41, 42 and 44, 45 within each server 31, 32 are respectively sharing processors 12, the hypervisor 46 allocates physical processor cycles between the virtual processors 13 of the partitions 41 and 42, 44 and 45 sharing the physical processors 12.

As shown in FIG. 1, SDR1 registers 14 may be pointed to the physical page table 52, 53, 54, 55 while in virtualized partition memory mode. A SDR1 register 14 may provide the processors 12 with the location and size of a physical page table 52. A page manager 15, 16 may be used by the hypervisor 46 to track changes to logical partition pages during migration. For instance, a page manager 15, 16 may include entries indicative of the state of each page of a partitions memory.

While the physical page table 52, 53, 54, 55, cache page table 58, 59, 61, 63 and page managers 15, 16 are shown in FIG. 1 as being included within either the logical partitions 41, 42, 44, 45 or the hypervisors 46, it should be understood by one of skill in the art that the virtual nature of these features may allow that the physical page table 52, 53, 54, 55, cache page table 58, 59, 61, 63 and page managers 15, 16 could otherwise be represented at other locations within the system 10 of FIG. 1. As shown, the relative positions of the features are generally intended to represent the access, control and/or association of the physical page table 52, 53, 54, 55, cache page table 50, 55, 56, 57 and page managers 15, 16 with respect to other components of the logical partitions 41, 42, 44, 45.

Each operating system 50, 55, 56, 57 controls the primary operations of its respective logical partition 41, 42, 44, 45 in a manner similar to the operating system of a non-partitioned computer. Each logical partition 41, 42, 44, 45 may execute in a separate memory space, represented by logical memory 60. Moreover, each logical partition 41, 42, 44, 45 may be statically and/or dynamically allocated a portion of the available resources in its respective computer 31, 32 of networked system 10. For example and as discussed herein, each logical partition 41, 42, 44, 45 may share one or more physical processors 12, as well as a portion of the available memory space for use in logical memory 60. In this manner, a given processor may be utilized by more than one logical partition.

The hypervisors 46 may include a dispatcher 51 that manages the dispatching of virtual processors to physical processors on a dispatch list, or ready queue 47. The ready queue 47 comprises memory that includes a list of virtual processors having work that is waiting to be dispatched on a physical processor 12. The hypervisors 46 shown in FIG. 1 also includes physical processors 12, in addition to processor control blocks 49. The processor control blocks 49 comprise memory that includes a list of virtual processors waiting for access on a particular physical processor 12.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 1 illustrates, for example, three logical buses 62, 64 and 66, with a plurality of resources on bus 62, including a direct access storage device (DASD) 68, a control panel 70, a tape drive 72 and an optical disk drive 74, allocated to a partition. Bus 64, on the other hand, may have resources allocated on a resource-by-resource basis, e.g., with local area network (LAN) adaptor 76, optical disk drive 78 and DASD 80 allocated to logical partition 42, and LAN adaptors 82 and 84 allocated to logical partition 44. Bus 66 may represent, for example, a bus allocated specifically to logical partition 44, such that all resources on the bus, e.g., DASD's 86 and 88, are allocated to the same logical partition.

It will be appreciated that the illustration of specific resources in FIG. 1 is merely exemplary in nature, and that any combination and arrangement of resources may be allocated to any logical partition in the alternative. For instance, it will be appreciated by one of skill in the art that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 1 may be implemented in a number of manners, including using various computer software applications, routines, components, programs, objects, modules, data structures, etc., referred to hereinafter as "computer programs," "tools," "programs" or "program code." Program code typically comprises one or more instructions that are resident at various times in various memory and storage devices in the computer, and that, when read and executed by one or more processors in the computer, cause that computer to perform the functions of the embodiments described herein.

Those skilled in the art will recognize that the exemplary environment illustrated in FIG. 1 is presented by way of example only and not by way of limitation. Though not shown in FIG. 1, for instance, one skilled in the art will appreciate that other partitions may be included within other embodiments, including a partition that comprises part of the hypervisors 46. This hypervisor partition may function in many ways like the conventional partitions 41, 42, 44, 45 (and associated operating systems), but has no user interface for the customer to protect it from failures that might otherwise come about through user interaction. Furthermore, while four logical partitions 41, 42, 44, 45 are shown in FIG. 1, one skilled in the art will appreciate that more or fewer partitions may be implemented as needed. Other alternative hardware and/or software environments may also be used in other embodiments.

Conventional models of transferring pages from a source partition to a target partition do not take into consideration the pages of the high and low resolution timers. So, the timers may not expire at the specified time interval. High resolution timers can be critical for the devices waiting on them, especially in a cloud or real-time production system. High resolution timers refer to timers for events which need to expire at a specific time with little or no tolerance in the expiration time. Low resolution timers are timers which have more tolerance for the expiration time. For example, a low resolution timer can expire within some tolerance level, such as 10 milliseconds, of the expiration time indicated by the low resolution timer. High resolution timers, in contrast, need to expire at the precise time set.

However, in a conventional environment, high resolution timers may not expire at the expected time interval after a live partition migration. For example, this could happen if the target partition does not have the corresponding page for the node of a high resolution timer and generates a page fault. This page fault is resolved by sending an interrupt to the source partition and retrieving the corresponding page from the source partition over a network. This demand paging over a network introduces latency. Due to the delay of the demand paging over a network, there can be a delay in expiry of the respective high resolution timer.

Figure 2:
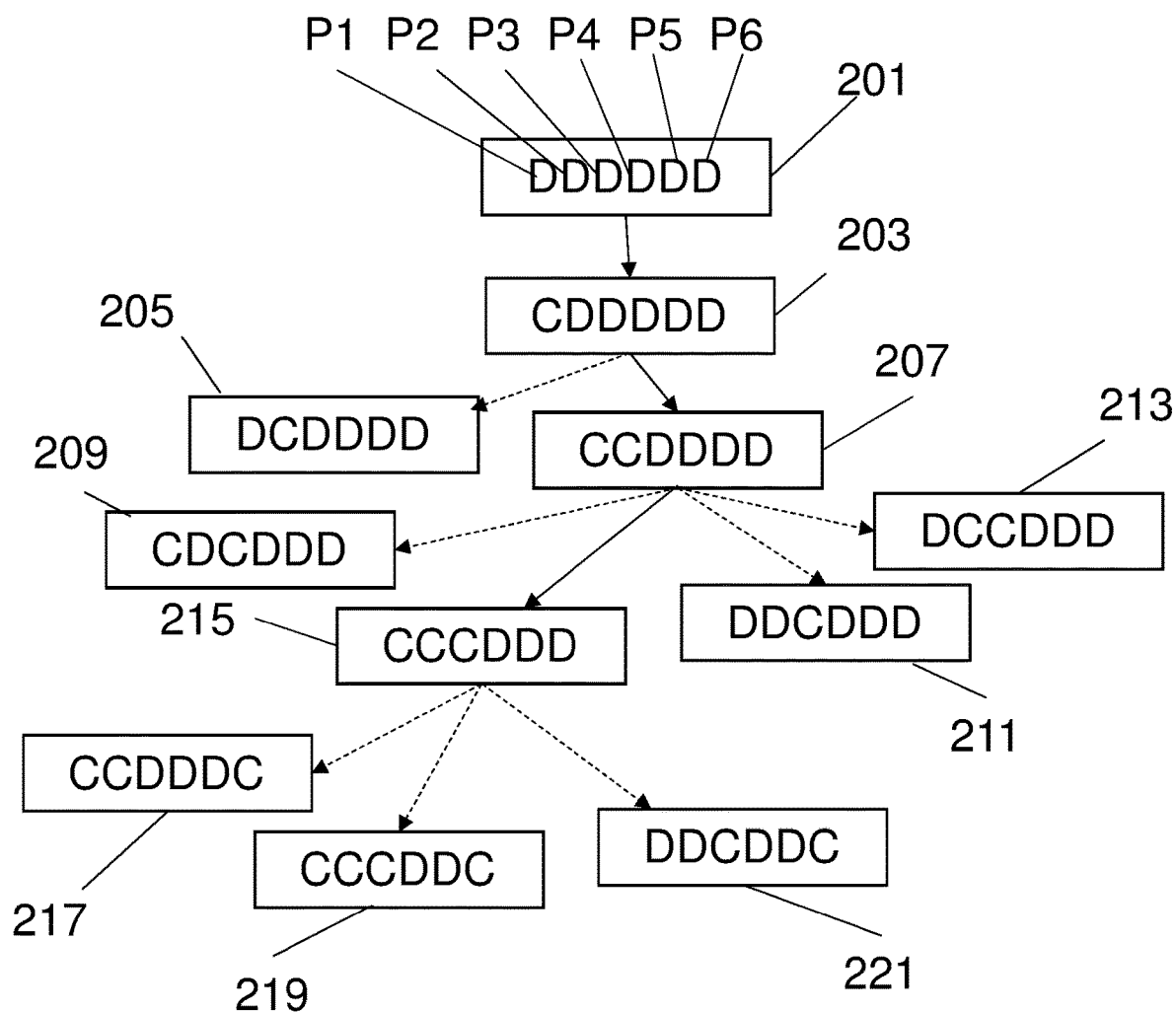
FIG. 2 is a diagram depicting the states of example pages during an example live partition migration process.

The hypervisors 46 are configured to help improve the accuracy of high resolution timers in a live partition migration. In particular, the hypervisors 46 are configured to ensure that identified high resolution timer pages are transferred to the target partition prior to freezing the live partition migration. For example, FIG. 2 depicts the states of six pages during an example live partition migration process. In FIG. 2, the letter "C" represents a "clean" state and the letter "D" represents a "dirty" state. As used herein, a "clean" page refers to a page which has been copied to the target partition and has not been changed subsequent to copying it to the target partition. Similarly, as used herein, a "dirty" page refers to a page which has not been copied to the target partition or which has been modified subsequent to copying it to the target partition. Thus, each letter in each box represents the state of a respective page, P1 . . . P6, as shown in FIG. 2, during the live partition migration. Furthermore, as understood by one of skill in the art, the source partition continues to run during a live partition migration until a predetermined point at which the source partition is stopped and the target partition begins running.

The hypervisors 46 in the embodiments described herein are configured to prevent freezing or stopping the live partition migration until all pages which have been identified as a high resolution timer have been copied to the target partition. In this way, the embodiments described herein improve the accuracy of high resolution timers during and after a live partition migration.

For purposes of explanation, the last page, P6, in FIG. 2 has been identified as containing a high resolution timer in this example. At block 201 in FIG. 2, each of the six example pages has a dirty state, as indicated by the six letters "D". Block 1 could represent the start of the pages in a live partition migration before any pages have been copied to the target partition or another point in the migration process at which all pages have either not been transferred or have been modified since being transferred. At block 203, the first page, P1, has been copied to the target partition and the state of the first page is changed to a clean state. Blocks 205 and 207 represent to possible states subsequent to the first page being copied. In particular, block 205 demonstrates that even though a second page, P2, has been transferred and changed to a clean state, the first page, P1, has been modified subsequent to being transferred to the target partition. Thus, at block 205, the state of page P1 is changed back to a dirty state. Block 207 represents the possibility that another page is transferred (e.g. page P2) and the first page P1 remains unmodified. Thus, at block 207, both pages P1 and P2 have a clean state.

Assuming for purposes of explanation that the system proceeds from block 203 to block 207 where both pages P1 and P2 have a clean state, blocks 209-215 represent possible states subsequent to block 207. It is to be understood that other states may also be possible subsequent to block 207 and that other possible states can occur subsequent to the system proceeding to block 205 in other embodiments. Thus, it is to be understood that not all possible subsequent states are depicted in FIG. 2. At block 209, the first and third pages, P1 and P3, have a clean state, but the second page, P2, has reverted to a dirty state. At block 211, the third page has a clean state, but the first and second pages have reverted to a dirty state. At block 213, the second and third pages have a clean state, but the first page has reverted to a dirty state. At block 215, the first, second, and third pages each have a clean state. Thus, each of the first, second, and third pages have been copied to the target partition and have not been modified since being copied.

In some conventional systems, a live partition migration is frozen once a pre-determined event has occurred, such as a threshold level of clean pages being copied to the target partition. As used herein, freezing the live partition migration refers to stopping execution of the source partition and beginning execution of the target partition. For example, in some systems, after 50% of the pages have a clean state, the target partition begins running and the source partition is stopped. Thus, such conventional systems would freeze the live partition migration to stop the source partition and begin execution of the target partition at block 215. However, as discussed above, such systems can cause high resolution timers to be delayed when the target partition has to request the high resolution timers through demand paging.

In the illustrative system of FIG. 1, however, the hypervisors 46 are configured to prevent freezing the live partition migration until all pages identified as containing a high resolution timer have been copied to the target partition and have a clean state. Thus, the hypervisors 46 make freezing the live partition migration conditional on copying all of the identified high resolution timers. In some embodiments, copying all of the high resolution timers is a separate condition in addition to a pre-determined event occurring, such as a threshold number of clean pages. In other embodiments, copying all of the high resolution timers can be used in lieu of a pre-determined event occurring. In the example shown in FIG. 2, both 50% of all of the pages having a clean state and all of the pages with high resolution timers having a clean state are conditions for freezing the live partition migration.

Hence, hence blocks 217 and 219 represent possible states subsequent to block 215 in which both conditions are met for freezing the live partition migration whereas block 221 represents a possible subsequent state in which both conditions for freezing the live partition migration are not met. In particular, although the last page P6 which corresponds to a high resolution timer has a clean state, the threshold level of 50% clean pages has no longer been met at block 221.

Returning to FIG. 1, the hypervisors 46 store information regarding which pages correspond to high resolution timers in a hypervisor information table 90. An example hypervisor information table for the six example pages of FIG. 2 is shown below in Table 1.

TABLE 1

Hypervisor Information Table

| Page | P1 | P2 | P3 | P4 | P5 | P6 |
|---|---|---|---|---|---|---|
| Mandatory Pre-copy | 0 | 0 | 0 | 0 | 0 | 1 |

The example Table 1 includes a field entitled "Mandatory Pre-copy" for each page which indicates whether the respective page is identified as a high resolution timer. In this example, the field contains a single bit where a value of '0' indicates that the page is not identified as a high resolution timer and a value of '1' indicates that the page is identified as a high resolution timer. It is to be understood that in other embodiments, more than 1 bit can be used in the field and/or the specific values indicating that a page is identified as a high resolution timer can be different than that shown in Table 1.

Each page frame table is also modified to include a mandatory pre-copy field. The mandatory pre-copy field is set to a predetermined value (e.g. '1') to indicate that the corresponding page is a high resolution timer. For example, when a device driver or kernel extension code allocates a high resolution timer, then the mandatory pre-copy field or bit of its corresponding page table is set to the predetermined value. In some embodiments, the information that the mandatory pre-copy field has been set is communicated from the operating system layer to the hypervisor layer through a hypervisor call. Hypervisor calls are known to one of skill in the art and not discussed in greater detail herein.

When a mandatory pre-copy field is to be set to indicate a high resolution timer, segment registers can help translate from the effective segment identification (ESID) to the virtual segment identification (VSID). The ESID corresponds to the segment register that is used to access the corresponding page. The VSID corresponds to the virtual address of the corresponding page. The VSID and virtual page number are then used to search a Translation Look aside Buffer (TLB) to obtain the real page number or logical address of the respective page from the perspective of the hypervisors 46. The mandatory pre-copy field of the page table at the corresponding logical address is then set. This information is then updated to the Hypervisor Information Table 90, as discussed above.

Figure 3:
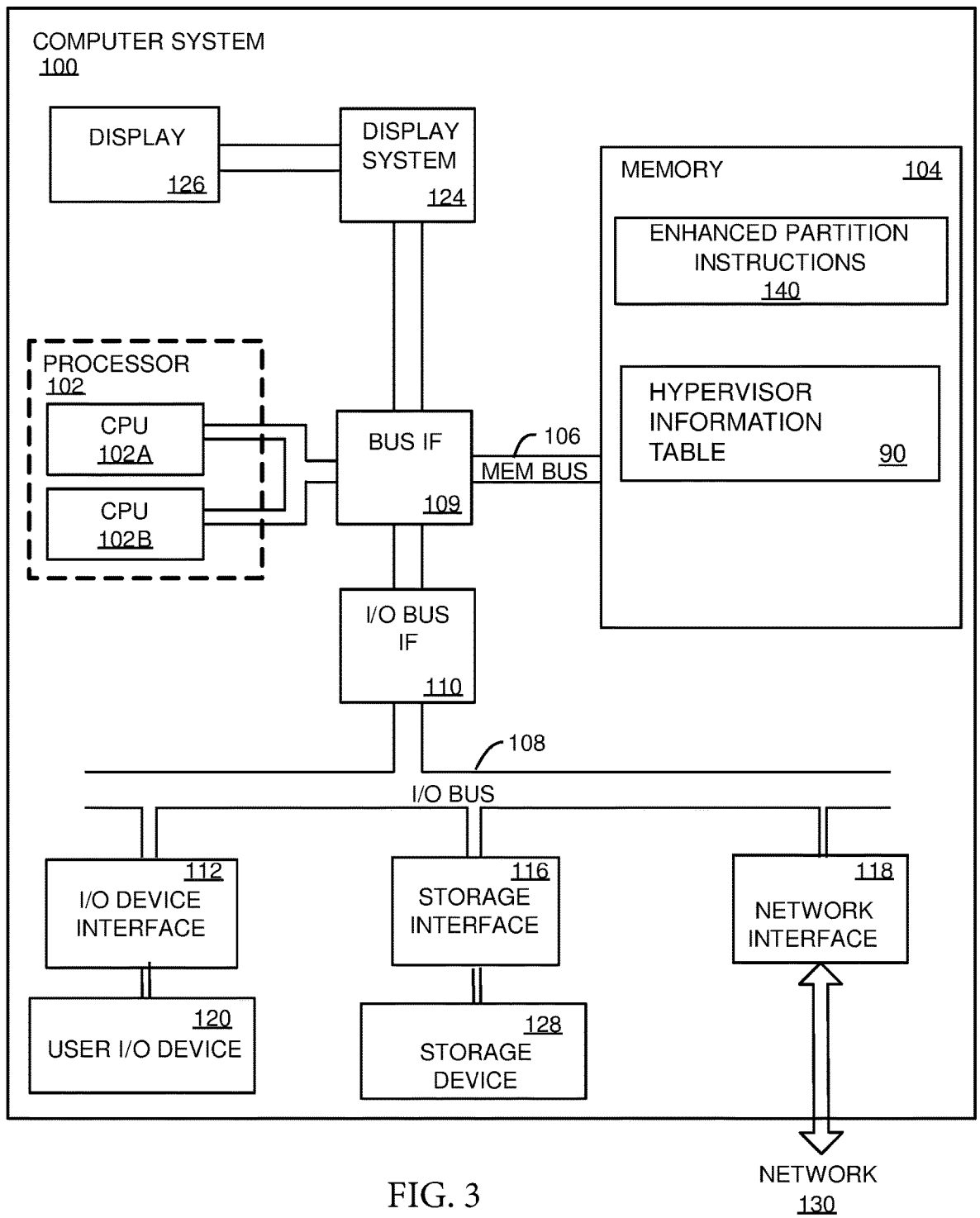
FIG. 3 is a high-level block diagram of one embodiment of an example enhanced computer system.

FIG. 3 is a high-level block diagram of one embodiment of an example enhanced computer system 100 configured to implement the functions discussed above. In particular, the computer system 100 is one example of a computer server, such as computer server 31 or 32 shown in FIG. 1. The components of the computer system 100 shown in FIG. 3 include one or more processors 102, a memory 104, a storage interface 116, an Input/Output ("I/O") device interface 112, and a network interface 118, all of which are communicatively coupled, directly or indirectly, for inter-component communication via a memory bus 106, an I/O bus 108, bus interface unit ("IF") 109, and an I/O bus interface unit 110.

In the embodiment shown in FIG. 3, the computer system 100 also includes one or more general-purpose programmable central processing units (CPUs) 102A and 102B, herein generically referred to as the processor 102. In some embodiments, the computer system 100 contains multiple processors. However, in other embodiments, the computer system 100 is a single CPU system. Each processor 102 executes instructions stored in the memory 104.

In some embodiments, the memory 104 includes a random-access semiconductor memory, storage device, or storage medium (either volatile or non-volatile) for storing or encoding data and programs. For example, the memory 104 may store enhanced partition instructions 140. In some embodiments, the memory 104 represents the entire virtual memory of the computer system 100, and may also include the virtual memory of other computer systems coupled directly to the computer system 100 or connected via a network 130. In some embodiments, the memory 104 is a single monolithic entity, but in other embodiments, the memory 104 includes a hierarchy of caches and other memory devices. For example, the memory 104 can exist in multiple levels of caches, and these caches may be further divided by function, so that one cache holds instructions while another holds non-instruction data, which is used by the processor. The memory 104 may be further distributed and associated with different CPUs or sets of CPUs, as is known in any various so-called non-uniform memory access (NUMA) computer architectures, for example.

Hence, although the enhanced partition instructions 140 and the hypervisor information table 90 are stored on the memory 104 in the example shown in FIG. 3 for purposes of explanation, it is to be understood that other embodiments can be implemented differently. For example, the enhanced partition instructions 140 and/or the hypervisor information table 90 can be distributed across multiple physical media in some embodiments.

Furthermore, in some embodiments, the enhanced partition instructions 140 are executed by the same processor 102. However, in other embodiments, execution of the enhanced partition instructions 140 is distributed across multiple processors located in the same or different computer systems. For example, in some such embodiments, at least a portion of the instructions and data structures associated with the enhanced partition instructions 140 can be on different computer systems and accessed remotely, e.g., via a network 130. The computer system 100 can use virtual addressing mechanisms that allow the programs of the computer system 100 to behave as if they only have access to a large, single storage entity instead of access to multiple, smaller storage entities. Thus, the memory 104 can store all or a portion of the various programs, modules, and data structures for improving accuracy of high resolution timers during a live partition migration, as discussed herein.

The computer system 100 in the embodiment shown in FIG. 3 also includes a bus interface unit 109 to handle communications among the processor 102, the memory 104, the display system 124, and the I/O bus interface unit 110. The I/O bus interface unit 110 is coupled with the I/O bus 108 for transferring data to and from the various I/O units. In particular, the I/O bus interface unit 110 can communicate with multiple I/O interface units 112, 116, and 118, which are also known as I/O processors (IOPs) or I/O adapters (IOAs), through the I/O bus 108. The display system 124 includes a display controller, a display memory, or both. The display controller can provide video, audio, or both types of data to a display device 126. The display memory may be a dedicated memory for buffering video data. The display system 124 is coupled with the display device 126, such as a standalone display screen, computer monitor, television, a tablet or handheld device display, or another other displayable device. In some embodiments, the display device 126 also includes one or more speakers for rendering audio. Alternatively, one or more speakers for rendering audio may be coupled with an I/O interface unit. In alternate embodiments, one or more functions provided by the display system 124 are on board an integrated circuit that also includes the processor 102. In addition, in some embodiments, one or more of the functions provided by the bus interface unit 109 is on board an integrated circuit that also includes the processor 102.

The I/O interface units support communication with a variety of storage and I/O devices. For example, the I/O device interface unit 112I supports the attachment of one or more user I/O devices 120, which may include user output devices (such as a video display devices, speaker, fax machine, printer, and/or television set) and user input devices (such as a keyboard, mouse, keypad, touchpad, trackball, buttons, light pen, or other pointing devices). A user can manipulate the user input devices 120 using a user interface, in order to provide input data and commands to the user I/O device 120 and the computer system 100. Additionally, a user can receive output data via the user output devices. For example, a user interface may be presented via the user I/O device 120, such as displayed on a display device, played via a speaker, or printed via a printer.

The storage interface 116 supports the attachment of one or more disk drives or direct access storage devices 128 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 128 is implemented via any type of secondary storage device. The contents of the memory 104, or any portion thereof, may be stored to and retrieved from the storage device 128 as needed. The network interface 118 provides one or more communication paths from the computer system 100 to other digital devices and computer systems.

Although the computer system 100 shown in FIG. 3 illustrates a particular bus structure providing a direct communication path among the processors 102, the memory 104, the bus interface 109, the display system 124, and the I/O bus interface unit 110, in alternative embodiments the computer system 100 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100, can include multiple I/O bus interface units 110 and/or multiple I/O buses 108 in other embodiments. While multiple I/O interface units are shown, which separate the I/O bus 108 from various communication paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, or any other suitable type of electronic device. In addition, in some embodiments, the computer system 100 can be implemented within a cloud computer system, or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers. Some example cloud computing embodiments are discussed in more detail below.

As discussed above, in some embodiments, one or more of the components and data shown in FIG. 3 include instructions or statements that execute on the processor 102 or instructions or statements that are interpreted by instructions or statements that execute the processor 102 to carry out the functions as described herein. In other embodiments, one or more of the components shown in FIG. 3 are implemented in hardware via semiconductor devices, chips, logical gates, circuits, circuit cards, and/or other physical hardware devices in lieu of, or in addition to, a processor-based system.

Figure 4:
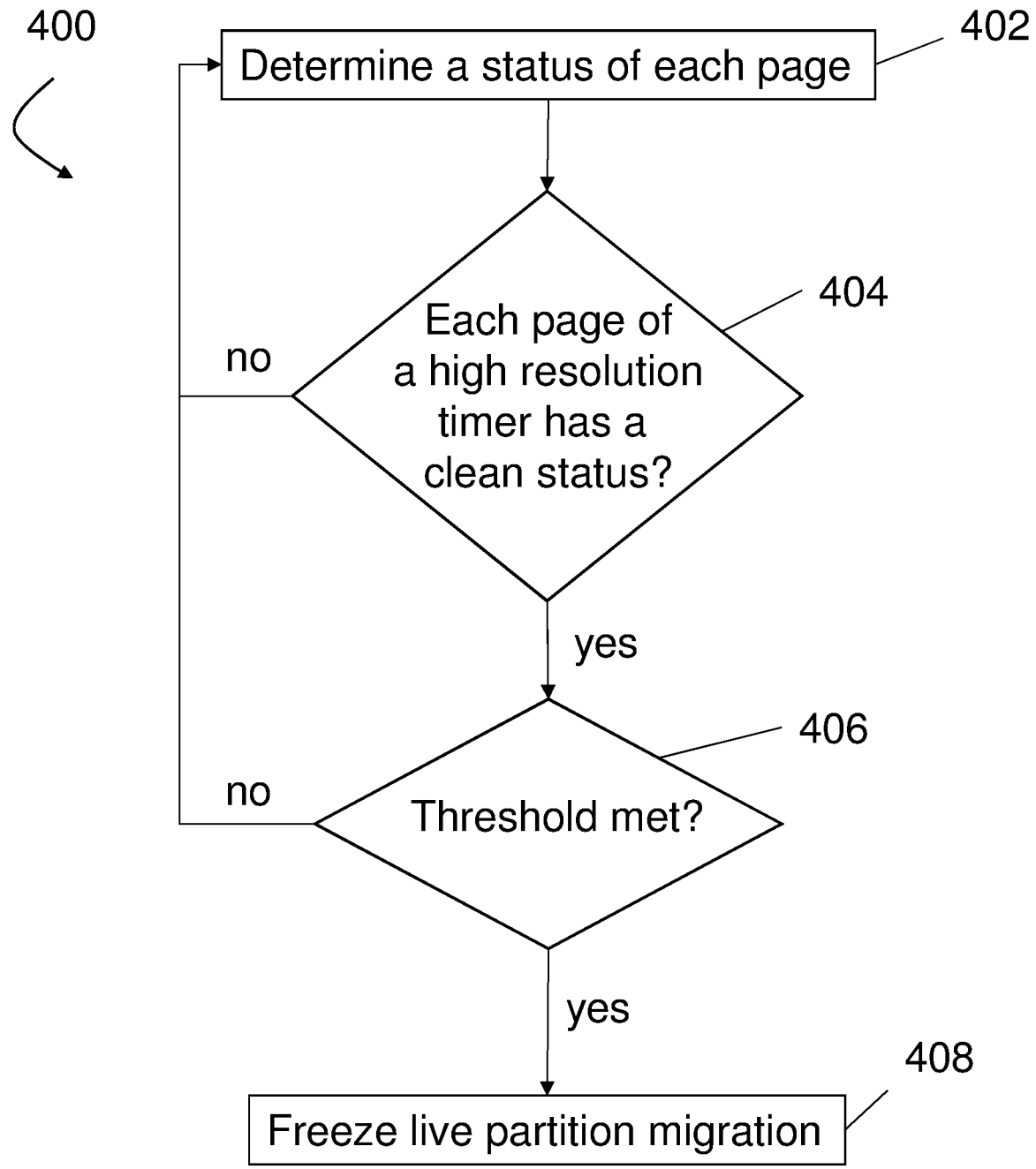
FIG. 4 is a flow chart depicting one embodiment of an example method of improving accuracy of high resolution timers in a live partition migration.

FIG. 4 is a flow chart depicting one embodiment of an example method 400 of improving accuracy of high resolution timers in a live partition migration. The method 400 can be implemented by a processor such as processor 102 in FIG. 3 in a system such as system 10 of FIG. 1.

At block 402, a status of each page of a plurality of pages is determined. The plurality of pages are to be copied from a source partition to a target partition during a live partition migration. As understood by one of skill in the art, during the live partition migration, the source partition continues to operate, as discussed above. One or more of the pages corresponds to a respective high resolution timer. The status of each page is either clean or dirty, as discussed above.

At block 404, it is determined if each of the one or more pages that correspond to a respective high resolution timer has a clean status. The one or more pages that correspond to a high resolution timer are identified in some embodiments by a new field included in each of the pages. The new field is referred to herein as a mandatory pre-copy field. To indicate that the page corresponds to a high resolution timer, the mandatory pre-copy field is set to a specific value. For example, in some embodiments, the mandatory pre-copy field is a single bit and the specific value is a logical '1'.

In some embodiments, setting the value of the mandatory pre-copy field includes translating an effective segment identification of the respective page to a virtual segment identification and searching a translation look aside buffer with the virtual segment identification to obtain a logical address of the respective page, as discussed above. The mandatory pre-copy field of the page at the logical address is then set to the specific value indicating that the page corresponds to a high resolution timer.

The value of the mandatory pre-copy field can be communicated to a hypervisor using a hypervisor call, as discussed above. The hypervisor then stores the value in a hypervisor information table and checks the hypervisor table to identify the one or more pages corresponding to a respective high resolution timer, as discussed above.

In addition, in some embodiments, the determination that each of the pages corresponding to a high resolution timer has a clean state also includes checking for all low resolution timers which contain links to a high resolution timer. The mandatory pre-copy field of pages corresponding to low resolution timers which contain links to a high resolution timer is also set to the value indicating that the respective page corresponds to a high resolution timer.

If each of the pages corresponding to a high resolution timer does not have a clean state at block 404, the method returns to block 402 to check the status of the plurality of pages. If each of the pages corresponding to a high resolution timer has a clean state at block 404, the method proceeds to block 406. At block 406, the number of pages, including both pages that correspond to a high resolution timer and pages that do not correspond to a high resolution timer, having a clean status is compared to a threshold. In some embodiments, the threshold is 50 percent of the total number of pages in the source partition.

If the threshold is met (e.g. the number of pages having a clean state is equal to or exceeds the threshold), then the method continues at block 408, where the live partition migration is frozen. Freezing the live partition migration includes halting operation of the source partition and initiating operation of the target partition, as discussed above. If the threshold is not met, then the method returns to block 402 to update the status of each of the pages.

It is to be understood that the order in which the blocks of method 400 described above are discussed is not to be construed as limiting the order in which the individual acts can be performed. In particular, the acts performed can be performed simultaneously or in a different order than that discussed. For example, in some embodiments, block 406 is performed prior to or at substantially the same time as block 404. Furthermore, in some embodiments, block 406 is not included. In such embodiments, the decision to freeze the live partition migration is only based on determining that each of the pages corresponding to a high resolution timer has a clean state.

Processing unit includes or functions with software programs, firmware or other computer readable instructions for carrying out various methods, process tasks, calculations, and control functions, used in improving the accuracy of high resolution timer expiry in a live partition migration.

These instructions are typically stored on any appropriate computer readable or processor-readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

Hence, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

EXAMPLE EMBODIMENTS

Example 1 includes a method of improving accuracy of high resolution timers in a live partition migration. The method comprises determining a status of each page of a plurality of pages to be copied from a source partition to a target partition during the live partition migration, wherein one or more pages of the plurality of pages correspond to a respective high resolution timer; determining that each of the one or more pages corresponding to a respective high resolution timer has a clean status, wherein a clean status indicates that the corresponding page has been copied to the target partition and has not been modified subsequent to being copied to the target partition; and halting operation of the source partition and initiating operation of the target partition in response to determining that each of the one or more pages corresponding to a respective high resolution timer has a clean status.

Example 2 includes the method of Example 1 and further comprises comparing the number of pages of the plurality of pages having a clean status with a threshold; wherein halting operation of the source partition and initiating operation of the target partition comprises halting operation of the source partition and initiating operation of the target partition in response to determining that each of the one or more pages corresponding to a respective high resolution timer has a clean status and in response to determining that the number of pages of the plurality of pages having a clean status is equal to or greater than the threshold.

Example 3 includes the method of Example 2, wherein the threshold is equal to 50 percent of the plurality of pages.

Example 4 includes the method of any of Examples 1-3, and further comprises setting a value in a mandatory pre-copy field of each of the one or more pages that correspond to a respective high resolution timer, the value indicating that the one or more pages correspond to a respective high resolution timer; communicating the value of the mandatory pre-copy field of each of the one or more pages to a hypervisor; and storing the value of the mandatory pre-copy field of each of the one or more pages in a hypervisor information table stored in a memory associated with the hypervisor.

Example 5 includes the method of Example 4, wherein the value of the mandatory pre-copy field in each of the one or more pages is a single bit.

Example 6 includes the method of any of Examples 4-5, wherein determining that each of the one or more pages corresponding to a respective high resolution timer has a clean status includes checking the hypervisor information table to identify the one or more pages corresponding to a respective high resolution timer.

Example 7 includes the method of any of Examples 4-6, wherein setting the value in the mandatory pre-copy field of each of the one or more pages includes translating an effective segment identification of the respective page to a virtual segment identification; searching a translation look aside buffer with the virtual segment identification to obtain a logical address of the respective page; and setting the value of the mandatory pre-copy field of the respective page at the logical address.

Example 8 includes a program product comprising a processor-readable storage medium having program instructions embodied thereon, wherein the program instructions are configured, when executed by at least one programmable processor, to cause the at least one programmable processor to determine a status of each page of a plurality of pages to be copied from a source partition to a target partition during the live partition migration, wherein one or more pages of the plurality of pages correspond to a respective high resolution timer; determine that each of the one or more pages corresponding to a respective high resolution timer has a clean status, wherein a clean status indicates that the corresponding page has been copied to the target partition and has not been modified subsequent to being copied to the target partition; and halt operation of the source partition and initiate operation of the target partition in response to determining that each of the one or more pages corresponding to a respective high resolution timer has a clean status.

Example 9 includes the program product of Example 8, wherein the program instructions are further configured to cause the at least one processor to compare the number of pages of the plurality of pages having a clean status with a threshold; and wherein the program instructions configured to cause the at least one processor to halt operation of the source partition and initiate operation of the target partition are further configured to cause the at least one processor to halt operation of the source partition and initiate operation of the target partition in response to determining that each of the one or more pages corresponding to a respective high resolution timer has a clean status and in response to determining that the number of pages of the plurality of pages having a clean status is equal to or greater than the threshold.

Example 10 includes the program product of Example 9, wherein the threshold is equal to 50 percent of the plurality of pages.

Example 11 includes the program product of any of Examples 8-10, wherein the program instructions are further configured to cause the at least one processor to set a value in a mandatory pre-copy field of each of the one or more pages that correspond to a respective high resolution timer, the value indicating that the one or more pages correspond to a respective high resolution timer; communicate the value of the mandatory pre-copy field of each of the one or more pages to a hypervisor; and store the value of the mandatory pre-copy field of each of the one or more pages in a hypervisor information table stored in a memory associated with the hypervisor; wherein the program instructions configured to cause the at least one processor to determine that each of the one or more pages corresponding to a respective high resolution timer has a clean status are further configured to cause the at least one processor to check the hypervisor information table to identify the one or more pages corresponding to a respective high resolution timer.

Example 12 includes the program product of Example 11, wherein the value of the mandatory pre-copy field in each of the one or more pages is a single bit.

Example 13 includes the program product of any of Examples 11-12, wherein the program instructions configured to cause the at least one processor to set the value in the mandatory pre-copy field of each of the one or more pages are configured to cause the at least one processor to translate an effective segment identification of the respective page to a virtual segment identification; search a translation look aside buffer with the virtual segment identification to obtain a logical address of the respective page; and set the value of the mandatory pre-copy field of the respective page at the logical address.

Example 14 includes a system comprising a memory; and a processor communicatively coupled to the memory; wherein the processor is configured to implement a logical partition having a plurality of pages, one or more of the plurality of pages corresponding to a respective high resolution timer; wherein the processor is further configured to determine a status of each page of the plurality of pages during a live partition migration from the logical partition to a second logical partition; wherein the processor is further configured to freeze the live partition migration in response to determining that each of the one or more pages corresponding to a respective high resolution timer has a clean status; wherein a clean status indicates that the corresponding page has been copied to the second logical partition and has not been modified subsequent to being copied to the second logical partition.

Example 15 includes the system of Example 14, wherein the processor is further configured to compare the number of pages of the plurality of pages having a clean status with a threshold; and wherein the processor is further configured to freeze the live partition migration in response to both determining that each of the one or more pages corresponding to a respective high resolution timer has a clean status and determining that the number of pages of the plurality of pages having a clean status is equal to or greater than the threshold.

Example 16 includes the system of Example 15, wherein the threshold is equal to 50 percent of the plurality of pages.

Example 17 includes the system of any of Examples 14-16, wherein the processor is further configured to set a value in a mandatory pre-copy field of each of the one or more pages that correspond to a respective high resolution timer, the value indicating that the one or more pages correspond to a respective high resolution timer; and store the value of the mandatory pre-copy field of each of the one or more pages in a hypervisor information table stored in a section of the memory associated with a hypervisor.

Example 18 includes the system of Example 17, wherein the value of the mandatory pre-copy field in each of the one or more pages is a single bit.

Example 19 includes the system of any of Examples 17-18, wherein the processor is configured to check the hypervisor information table to identify the one or more pages corresponding to a respective high resolution timer.

Example 20 includes the system of any of Examples 17-19, wherein the processor is configured to set the value in the mandatory pre-copy field of each of the one or more pages by translating an effective segment identification of the respective page to a virtual segment identification; searching a translation look aside buffer with the virtual segment identification to obtain a logical address of the respective page; and setting the value of the mandatory pre-copy field of the respective page at the logical address.

Although specific embodiments have been illustrated and described herein, it will be appreciated by those of ordinary skill in the art that any arrangement, which is calculated to achieve the same purpose, may be substituted for the specific embodiments shown.

What is claimed is:

1. A method of improving accuracy of high resolution timers in a live partition migration, the method comprising:
    determining, prior to halting the source partition and prior to running the target partition, a status of each page of a plurality of pages to be copied from a source partition to a target partition during the live partition migration, wherein one or more pages of the plurality of pages correspond to a respective high resolution timer, wherein the one or more pages corresponding to a respective high resolution timer comprise less than all of the plurality of pages;
    determining, prior to halting the source partition and prior to running the target partition, that each of the one or more pages corresponding to a respective high resolution timer has a clean status, wherein determining that each of the one or more pages corresponding to a respective high resolution timer has a clean status comprises determining that the corresponding page has been copied to the target partition and determining that the corresponding page has not been modified at the source partition subsequent to being copied to the target partition; and
    halting the source partition and running the target partition in response to determining that each of the one or more pages corresponding to a respective high resolution timer has a clean status.

2. The method of claim 1, further comprising:
    comparing a total number of pages of the plurality of pages having a clean status with a threshold; and
    wherein halting the source partition and running the target partition comprises halting the source partition and running the target partition in response to determining that each of the one or more pages corresponding to a respective high resolution timer has a clean status and in response to determining that the total number of pages of the plurality of pages having a clean status is equal to or greater than the threshold.

3. The method of claim 2, wherein the threshold is equal to 50 percent of the plurality of pages.

4. The method of claim 1, further comprising:
setting a value in a mandatory pre-copy field of each of the one or more pages that correspond to a respective high resolution timer, the value indicating that the one or more pages correspond to a respective high resolution timer;
communicating the value of the mandatory pre-copy field of each of the one or more pages to a hypervisor; and
storing the value of the mandatory pre-copy field of each of the one or more pages in a hypervisor information table stored in a memory associated with the hypervisor.

5. The method of claim 4, wherein the value of the mandatory pre-copy field in each of the one or more pages is a single bit.

6. The method of claim 4, wherein determining that each of the one or more pages corresponding to a respective high resolution timer has a clean status includes checking the hypervisor information table to identify the one or more pages corresponding to a respective high resolution timer.

7. The method of claim 4, wherein setting the value in the mandatory pre-copy field of each of the one or more pages includes:
translating an effective segment identification of the respective page to a virtual segment identification;
searching a translation look aside buffer with the virtual segment identification to obtain a logical address of the respective page; and
setting the value of the mandatory pre-copy field of the respective page at the logical address.

8. A program product comprising a non-transitory processor-readable storage medium having program instructions embodied thereon, wherein the program instructions are configured, when executed by at least one programmable processor, to cause the at least one programmable processor to:
determine, prior to halting the source partition and prior to running the target partition, a status of each page of a plurality of pages to be copied from a source partition to a target partition during the live partition migration, wherein one or more pages of the plurality of pages correspond to a respective high resolution timer, wherein each respective high resolution timer is a timer which needs to expire at a respective precise time;
determine, prior to halting the source partition and prior to running the target partition, that each of the one or more pages corresponding to a respective high resolution timer has a clean status, wherein a clean status indicates that the corresponding page has been copied to the target partition and has not been modified at the source partition subsequent to being copied to the target partition; and
prevent halting the source partition and prevent running the target partition until each of the one or more pages corresponding to a respective high resolution timer has a clean status.

9. The program product of claim 8, wherein the program instructions are further configured to cause the at least one processor to:
compare a total number of pages of the plurality of pages having a clean status with a threshold; and
wherein the program instructions configured to cause the at least one processor to prevent halting the source partition and prevent running the target partition are further configured to cause the at least one processor to prevent halting the source partition and prevent running the target partition until each of the one or more pages corresponding to a respective high resolution timer has a clean status and the total number of pages of the plurality of pages having a clean status is equal to or greater than the threshold.

10. The program product of claim 9, wherein the threshold is equal to 50 percent of the plurality of pages.

11. The program product of claim 8, wherein the program instructions are further configured to cause the at least one processor to:
set a value in a mandatory pre-copy field of each of the one or more pages that correspond to a respective high resolution timer, the value indicating that the one or more pages correspond to a respective high resolution timer;
communicate the value of the mandatory pre-copy field of each of the one or more pages to a hypervisor; and
store the value of the mandatory pre-copy field of each of the one or more pages in a hypervisor information table stored in a memory associated with the hypervisor;
wherein the program instructions configured to cause the at least one processor to determine that each of the one or more pages corresponding to a respective high resolution timer has a clean status are further configured to cause the at least one processor to check the hypervisor information table to identify the one or more pages corresponding to a respective high resolution timer.

12. The program product of claim 11, wherein the value of the mandatory pre-copy field in each of the one or more pages is a single bit.

13. The program product of claim 11, wherein the program instructions configured to cause the at least one processor to set the value in the mandatory pre-copy field of each of the one or more pages are configured to cause the at least one processor to:
translate an effective segment identification of the respective page to a virtual segment identification;
search a translation look aside buffer with the virtual segment identification to obtain a logical address of the respective page; and
set the value of the mandatory pre-copy field of the respective page at the logical address.

14. A system comprising:
a memory; and
a processor communicatively coupled to the memory;
wherein the processor is configured to implement a first logical partition having a plurality of pages, one or more of the plurality of pages corresponding to a respective high resolution timer;
wherein the processor is further configured to determine, prior to halting the first logical partition and prior to running a second logical partition, a status of each page of the plurality of pages during a live partition migration from the first logical partition to the second logical partition;
wherein the processor is further configured to halt the first logical partition and to run the second logical partition in response to determining, prior to halting the first logical partition and prior to running the second logical partition, that each of the one or more pages corresponding to a respective high resolution timer has a clean status;

wherein a clean status indicates that the corresponding page has been copied to the second logical partition and has not been modified at the first logical partition subsequent to being copied to the second logical partition.

15. The system of claim 14, wherein the processor is further configured to compare a total number of pages of the plurality of pages having a clean status with a threshold; and wherein the processor is further configured to halt the first logical partition and to run the second logical partition in response to both determining that each of the one or more pages corresponding to a respective high resolution timer has a clean status and determining that the total number of pages of the plurality of pages having a clean status is equal to or greater than the threshold.

16. The system of claim 15, wherein the threshold is equal to 50 percent of the plurality of pages.

17. The system of claim 14, wherein the processor is further configured to:

set a value in a mandatory pre-copy field of each of the one or more pages that correspond to a respective high resolution timer, the value indicating that the one or more pages correspond to a respective high resolution timer; and store the value of the mandatory pre-copy field of each of the one or more pages in a hypervisor information table stored in a section of the memory associated with a hypervisor.

18. The system of claim 17, wherein the value of the mandatory pre-copy field in each of the one or more pages is a single bit.

19. The system of claim 17, wherein the processor is configured to check the hypervisor information table to identify the one or more pages corresponding to a respective high resolution timer.

20. The system of claim 17, wherein the processor is configured to set the value in the mandatory pre-copy field of each of the one or more pages by:

translating an effective segment identification of the respective page to a virtual segment identification;

searching a translation look aside buffer with the virtual segment identification to obtain a logical address of the respective page; and setting the value of the mandatory pre-copy field of the respective page at the logical address.

\* \* \* \* \*